United States Patent
Havlir

(10) Patent No.: US 10,592,248 B2
(45) Date of Patent: Mar. 17, 2020

(54) BRANCH TARGET BUFFER COMPRESSION

(71) Applicant: Advanced Micro Devices, Inc., Sunnyvale, CA (US)

(72) Inventor: Steven R. Havlir, Austin, TX (US)

(73) Assignee: ADVANCED MICRO DEVICES, INC., Sunnyvale, CA (US)

( * ) Notice: Subject to any disclaimer, the term of this patent is extended or adjusted under 35 U.S.C. 154(b) by 123 days.

(21) Appl. No.: 15/252,164

(22) Filed: Aug. 30, 2016

(65) Prior Publication Data

US 2018/0060073 A1  Mar. 1, 2018

(51) Int. Cl.
*G06F 9/38* (2018.01)
*G06F 12/0875* (2016.01)
*G06F 12/0862* (2016.01)

(52) U.S. Cl.
CPC ........ *G06F 9/3806* (2013.01); *G06F 12/0862* (2013.01); *G06F 12/0875* (2013.01); *G06F 2212/452* (2013.01)

(58) Field of Classification Search
None
See application file for complete search history.

(56) References Cited

U.S. PATENT DOCUMENTS

| | | | |
|---|---|---|---|
| 5,706,492 A | 1/1998 | Hoyt et al. | |
| 5,805,878 A | 9/1998 | Rahman et al. | |
| 5,835,754 A | 11/1998 | Nakanishi | |
| 6,427,192 B1 | 7/2002 | Roberts | |
| 9,235,419 B2 | 1/2016 | Bonanno et al. | |
| 2002/0194462 A1* | 12/2002 | Henry | G06F 9/3017 712/238 |
| 2004/0143709 A1* | 7/2004 | McDonald | G06F 9/3806 711/144 |
| 2004/0230780 A1* | 11/2004 | Prasky | G06F 9/3806 712/238 |
| 2005/0198479 A1* | 9/2005 | Bean | G06F 9/30149 712/237 |
| 2006/0010310 A1* | 1/2006 | Bean | G06F 9/3804 712/238 |
| 2006/0095750 A1* | 5/2006 | Nye | G06F 9/3848 712/240 |
| 2009/0177875 A1* | 7/2009 | Moyer | G06F 9/3806 712/238 |
| 2017/0090935 A1* | 3/2017 | Falsafi | G06F 9/3806 |

* cited by examiner

*Primary Examiner* — George Giroux
(74) *Attorney, Agent, or Firm* — Vople and Koenig, P.C.

(57) ABSTRACT

Techniques for improving branch target buffer ("BTB") operation. A compressed BTB is included within a branch prediction unit along with an uncompressed BTB. To support prediction of up to two branch instructions per cycle, the uncompressed BTB includes entries that each store data for up to two branch predictions. The compressed BTB includes entries that store data for only a single branch instruction for situations where storing that single branch instruction in the uncompressed BTB would waste space in that buffer. Space would be wasted in the uncompressed BTB due to the fact that, in order to support two branch lookups per cycle, prediction data for two branches must have certain features in common (such as cache line address) in order to be stored together in a single entry.

20 Claims, 6 Drawing Sheets

BRANCH TARGET BUFFER COMPRESSION

BACKGROUND

In a microprocessor, instructions are fetched for execution sequentially until a branch occurs. A branch causes a change in the address from which instructions are fetched and may be associated with delays in instruction fetch throughput. For example, branches may need to be evaluated to determine whether to take the branch as well as what the branch destination is. However, branches cannot be evaluated until the branch has actually entered the instruction execution pipeline. Branch delays are associated with the difference between the time that the branch is fetched and the time that the branch is evaluated to determine the outcome of that branch and thus what instructions need to be fetched next.

Branch prediction helps to mitigate this delay by predicting the existence and outcome of a branch instruction based upon instruction address and on branch evaluation history. Branch prediction techniques may use a global history of branch conditional decisions (e.g., taken or not-taken), and the current program counter value to make a prediction of whether a branch exists and whether that branch should be taken. A branch target buffer stores information that associates program counter addresses with branch targets. The existence of an entry in the branch target buffer implicitly indicates that a branch exists at the program counter associated with that entry. A branch predictor can use the global history and branch target buffer data to make branch prediction decisions. Because of the delays associated with branch instructions, efficient branch prediction and well-designed branch prediction logic is important in microprocessor design.

BRIEF DESCRIPTION OF THE DRAWINGS

A more detailed understanding may be had from the following description, given by way of example in conjunction with the accompanying drawings wherein.

DETAILED DESCRIPTION

A compressed branch target buffer is included within a branch prediction unit along with an uncompressed branch target buffer. To support prediction of up to two branch instructions per cycle, the uncompressed branch target buffer includes entries that each store data for up to two branch predictions. The compressed branch target buffer includes entries that store data for only a single branch instruction for situations where storing that single branch instruction in the uncompressed branch target buffer would waste space in that buffer. Space would be wasted in the uncompressed branch target buffer due to the fact that prediction data for two branches must have certain features in common (such as cache line address) in order to be stored together in a single entry. If a branch does not share such features with another branch, then that branch would need its own entry in the uncompressed branch target buffer. Instead, that branch is stored in the compressed branch target buffer.

Figure 1:
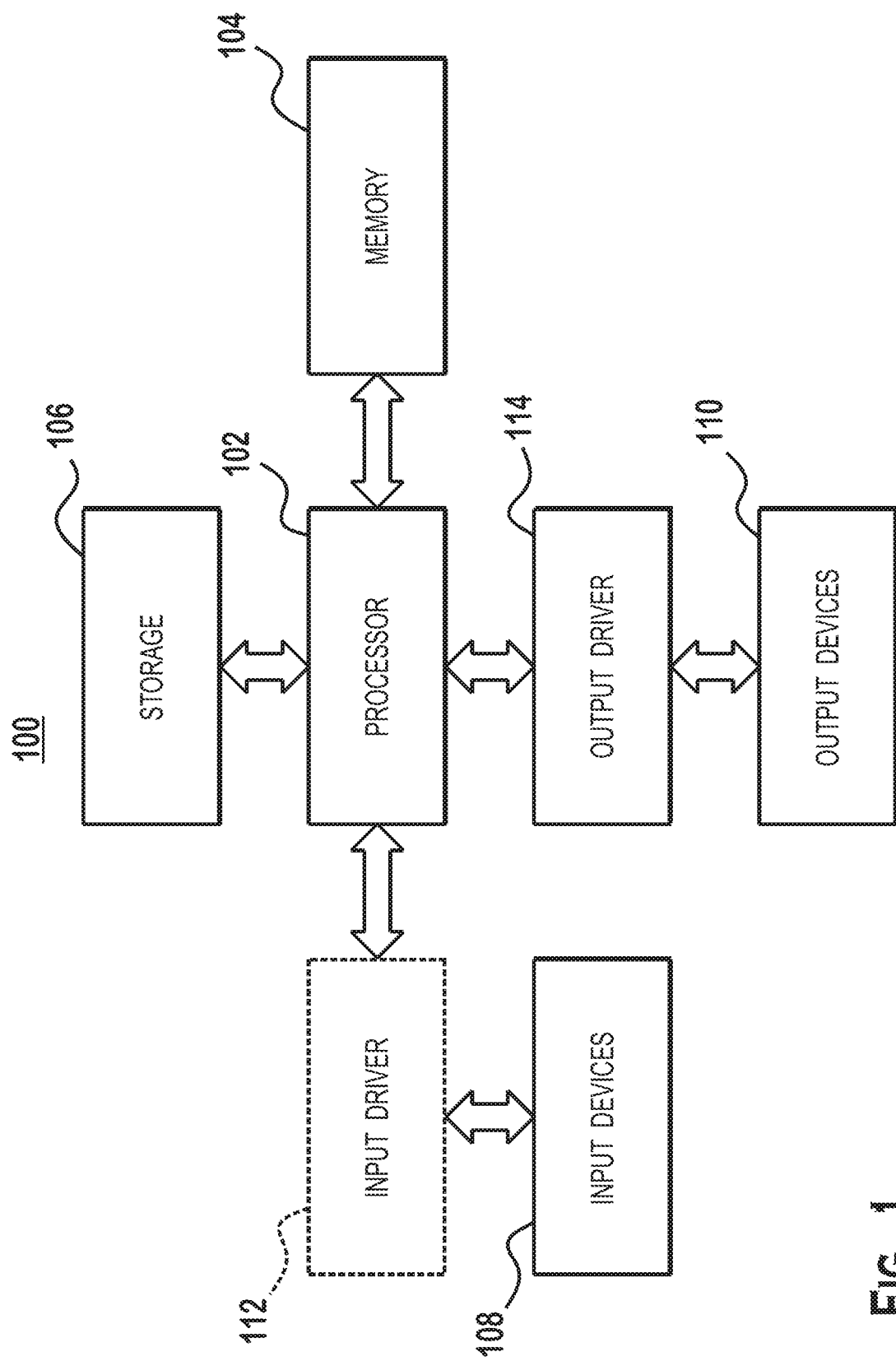
FIG. 1 is a block diagram of an example device in which one or more disclosed embodiments may be implemented.

FIG. 1 is a block diagram of an example device 100 in which aspects of the present disclosure are implemented. The device 100 includes, for example, a computer, a gaming device, a handheld device, a set-top box, a television, a mobile phone, or a tablet computer. The device 100 includes a processor 102, a memory 104, a storage device 106, one or more input devices 108, and one or more output devices 110. The device 100 may also optionally include an input driver 112 and an output driver 114. It is understood that the device 100 may include additional components not shown in FIG. 1.

The processor 102 includes a central processing unit (CPU), a graphics processing unit (GPU), a CPU and GPU located on the same die, or one or more processor cores, wherein each processor core is a CPU or a GPU. The memory 104 may be located on the same die as the processor 102, or may be located separately from the processor 102. The memory 104 includes a volatile or non-volatile memory, for example, random access memory (RAM), dynamic RAM, or a cache.

The storage device 106 includes a fixed or removable storage, for example, a hard disk drive, a solid state drive, an optical disk, or a flash drive. The input devices 108 include a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 include a display, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 and the output driver 114 are optional components, and that the device 100 will operate in the same manner if the input driver 112 and the output driver 114 are not present.

Figure 2:
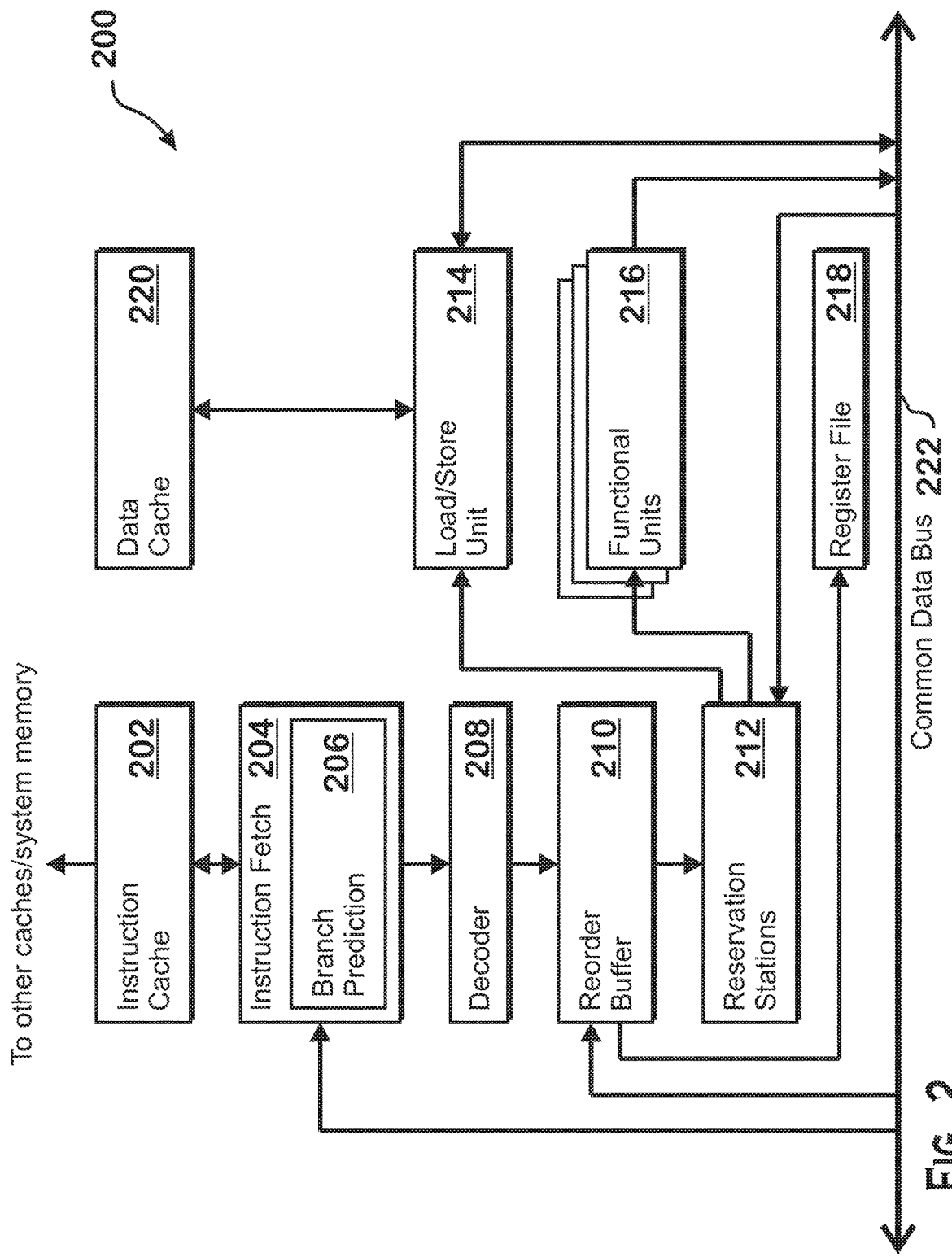
FIG. 2 is a block diagram of an instruction execution pipeline, located within the processor of FIG. 1.

FIG. 2 is a block diagram of an instruction execution pipeline 200, located within the processor 102 of FIG. 1. The instruction execution pipeline 200 retrieves instructions from memory and executes the instructions, outputting data to memory and modifying the state of elements within the instruction execution pipeline 200, such as registers within register file 218.

The instruction execution pipeline 200 includes an instruction fetch unit 204 configured to fetch instructions from system memory (such as memory 104) via an instruction cache 202, a decoder 208 configured to decode fetched instructions, functional units 216 configured to perform calculations to process the instructions, a load store unit 214, configured to load data from or store data to system memory via a data cache 220, and a register file 218, which includes registers that store working data for the instructions. A reorder buffer 210 tracks instructions that are currently in-flight and ensures in-order retirement of instructions despite allowing out-of-order execution while in-flight. "Inflight" instructions refers to instructions that have been received by the reorder buffer 210 but have not yet had results committed to the architectural state of the processor (e.g., results written to a register file, or the like). Reservation stations 212 maintain in-flight instructions and track instruction operands. When all operands are ready for execution of a particular instruction, reservation stations 212 send the instruction to a functional unit 216 or a load/store unit 214 for execution. Completed instructions are marked for retirement in the reorder buffer 210 and are retired when at the head of the reorder buffer queue 210. Retirement refers to the act of committing results of an instruction to the architectural state of the processor. For example, writing an addition result to a register, by an add instruction, writing a loaded value to a register by a load instruction, or causing instruction flow to jump to a new location, by a branch instruction, are all examples of retirement of the instruction.

Various elements of the instruction execution pipeline 200 communicate via a common data bus 222. For example, the functional units 216 and load/store unit 214 write results to the common data bus 222 which may be read by reservation stations 212 for execution of dependent instructions and by the reorder buffer 210 as the final processing result of an in-flight instruction that has finished execution. The load/store unit 214 also reads data from the common data bus 222. For example, the load/store unit 214 reads results from completed instructions from the common data bus 222 and writes the results to memory via the data cache 220 for store instructions.

Typically, the instruction fetch unit 204 fetches instructions sequentially in memory. Sequential control flow may be interrupted by branch instructions, which causes the instruction pipeline 200 to fetch instructions from a non-sequential address. Branch instructions may be conditional, causing a branch only if a particular condition is satisfied, or non-conditional, and may specify a target directly or indirectly. Direct targets are specified by constants in the instruction byte itself and indirect targets are specified by some calculation. Direct and indirect branches may be conditional or non-conditional.

Sequential fetching of instructions is relatively simple for the instruction execution pipeline 200. The instruction fetch unit 204 sequentially fetches large chunks of contiguously stored instructions for execution. However, a branch instruction may interrupt such fetching for a few reasons. More specifically, depending on the type of branch instruction, any or all of the following may happen for execution of the branch instruction: the instruction decoder 208 determines that the instruction is in fact a branch instruction, the functional units 216 calculate a target for the branch instruction, and the functional units 216 evaluate the conditional of the branch instruction. Because a delay exists between when a branch instruction is fetched and issued for execution by the instruction fetch unit 204 and when the branch instruction is actually executed by the instruction execution pipeline 200, the instruction fetch unit 204 includes a branch prediction unit 206.

The branch prediction unit 206 generates a branch conditional prediction (e.g., taken or not-taken) and a branch target prediction based on addresses of instructions to be fetched. The branch prediction unit 206 may use branch conditional history, maintained and manipulated via any of a variety of known techniques, as well as branch target history that correlates instruction program counters with branch target addresses. Upon detecting a predicted branch, identifying a predicted target address for the predicted branch, and predicting that the target path is taken, the branch prediction unit 206 causes the instruction fetch unit 204 to begin fetching instructions from the predicted target address. The branch prediction unit 206 thus helps to reduce delays that occur as the result of branch instructions.

Although branches are predicted by branch prediction unit 206, such predictions may be inaccurate. Branch instructions are therefore still sent to the rest of the instruction execution pipeline 200 for execution. Determination that a branch prediction is correct results in no correction to processor instruction flow. However, determination that a branch prediction was incorrect ("a misprediction") will result in a corrective action, including resetting the instruction execution pipeline state as well as revisions to branch prediction data stored by the branch prediction unit 206.

More specifically, mispredictions are detected by executing the branch instruction by the instruction execution pipeline 200 and comparing the result to the branch prediction. Upon making a determination that a branch was mispredicted, the instruction execution pipeline 200 corrects the processor state, including the program counter, and begins fetching instructions based on the now-corrected program counter. Correcting the processor state may include flushing any in-flight instructions from a control flow path associated with a mispredicted branch instruction and reverting any other pipeline state data to account for any instructions associated with the mispredicted control flow path, and represents a significant performance penalty. For this reason, accurate branch prediction improves overall processing performance.

Figure 3:
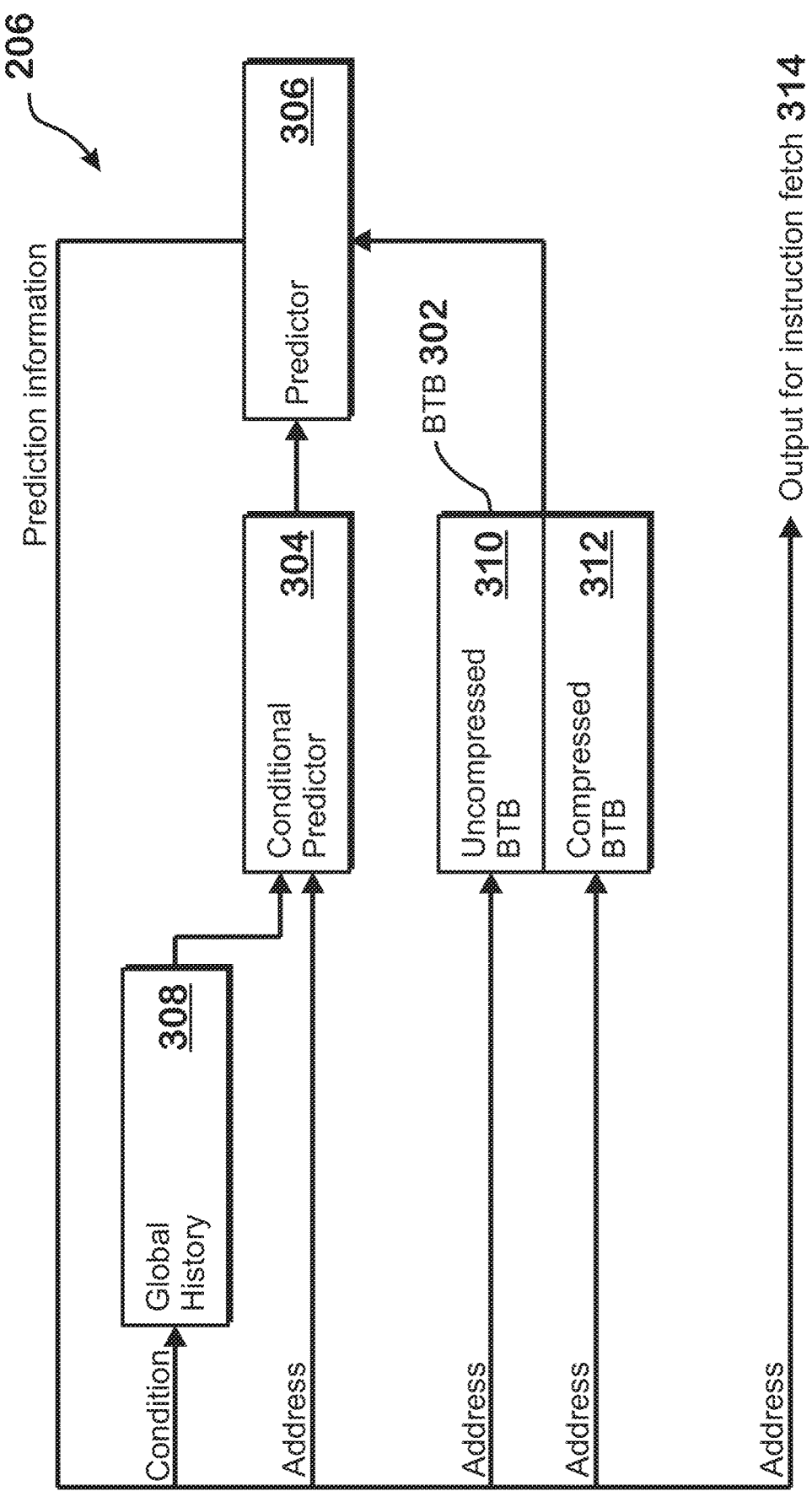
FIG. 3 is a block diagram illustrating an example branch prediction unit.

FIG. 3 is a block diagram illustrating an example branch prediction unit 206. As shown, the branch prediction unit 206 includes a conditional predictor 304, an uncompressed branch target buffer ("BTB") 310, a compressed BTB 312, global history memory 308, and a predictor 306. The compressed BTB 312 and uncompressed BTB 310 together comprise a BTB 302.

The units of the branch prediction unit 206 work together to predict the outcome of branch instructions under examination and to provide a predicted address for instruction fetch to the instruction fetch unit 204 based on the predicted branch outcome. Prediction information output from predictor 306 includes a predicted address from which to fetch next instructions and predicted conditional decisions that represent whether conditional branches are predicted to be taken or not taken. The predictor 306 provides the address and conditional decisions to the global history memory 308, the conditional predictor 304, and the uncompressed BTB 310 and compressed BTB 312 for further predictions. The global history 308 updates an internal store of branch prediction history based on the prediction information and outputs a global history value to the conditional predictor 304. The conditional predictor 304 also receives the predicted next address from the predictor 306 in order to provide a conditional prediction. The conditional predictor 304 may provide the conditional prediction according to any known technique. In one example, the conditional predictor 304 identifies, based on an entry in the BTB 312, that a particular instruction is predicted to be a branch instruction, obtains a global branch history bit value from the global history memory 308, processes the bits of the global branch history bit value based on a prediction algorithm, and obtains a prediction result based on the processed bits. The predicted next address is also provided to the uncompressed BTB 310 and the compressed BTB 312 in parallel for identification of branch instructions in the instruction stream and for determination of predicted target addresses for those branch instructions.

To support high prediction throughput, the uncompressed BTB 310 allows for lookup of up to two branches per cycle. This capability is achieved by including data for up to two branches in each entry of the uncompressed BTB 310. More specifically, entries in the uncompressed BTB 310 are tagged by instruction cache line address. A hit for a single provided instruction cache line address thus allows for up to two predicted branch targets and two instructions predicted as being branch instructions to be provided per cycle. However, there may be situations in which a single entry in the uncompressed BTB 310 cannot store data for more than one predicted branch instruction. For example, if a cache line includes only one branch instruction, then the BTB entry (which is tagged by cache line address) can only include data for one branch instruction. In such a situation, the additional space in the entry corresponding to a second predicted branch instruction is wasted.

Therefore, a compressed BTB 312 is also included. The compressed BTB 312 includes entries sized for data for only a single branch prediction target. Entries in the compressed BTB 312 may therefore be used when not enough branch target prediction data is present for a particular cache line to fill an entire entry in the uncompressed BTB 310. As with the uncompressed BTB 310, entries in the compressed BTB 312 are looked up using the cache line address of the cache line for which branch prediction is being performed.

Additional space may be saved in entries in the compressed BTB 312 by compressing one or more items of branch attribute data that would be stored in the uncompressed BTB 310. In some examples, this compression is accomplished by assuming a "common case" value for a particular attribute. All branch instructions that do not match the common case cannot be stored within the compressed BTB 312 and all branch instructions with corresponding entries in the compressed BTB 312 are assumed to have the common case value. Compression may also be accomplished in a more complicated manner, by substituting values that require a certain amount of bits for other values that require fewer bits, or by converting two or more independent attribute fields into a shared field that indicates common combinations of the two or more independent attribute fields, where the shared field has fewer bits than the independent attribute fields. Only attribute values deemed to be "common" are allowed to be stored in the compressed BTB 312 and branch prediction data for branches having uncommon attribute values are stored in the uncompressed BTB 310. Although shown with only a single compressed BTB 312, the branch prediction unit 206 may alternatively include multiple compressed BTBs, each of which has a different compression scheme. For example, attributes for entries in one compressed BTB may be assumed to have one specific value while attributes for entries in another compressed BTB may be assumed to have a different specific value. The compression scheme may be different in other ways as well.

In addition to entries that cannot be compressed due to having "uncommon attribute values," one other type of entry cannot be stored in the compressed BTB 312. More specifically, some branch target buffer entries are considered "large" branch target buffer entries. Large entries are those that include a full length target address rather than a shortened target address. More specifically, branch instructions typically have targets that are relatively near to the address of the branch instruction itself. Targets of branch instructions can therefore be stored in the branch target buffer with a number of bits that is less than the full address size. However, when a branch instruction has a target that is sufficiently far away from the address of the branch instruction, the branch target buffer must store a larger number of address bits. Because of the larger number of bits required for storage, such types of branch instructions are stored in the uncompressed BTB 310 and cannot be stored in the compressed BTB 312.

The compressed BTB 312 and uncompressed BTB 310 may be embodied as a cache that is indexed by the cache line address of the cache line that is currently being examined for branch prediction purposes. In one example, the compressed BTB 312 and uncompressed BTB 310 form an n-way associative cache, with a first number of the n ways comprising the compressed BTB 312 and another number of the n ways comprising the uncompressed BTB 310. Lookup can thus be performed in parallel on the uncompressed BTB 310 and compressed BTB 312 by providing the cache line address as the tag and identifying a matching entry from either the uncompressed BTB 312 or the compressed BTB 310 for further processing. A conflicting lookup, where more than one entry exists for a given tag, will result in selection and output of data from a single entry for branch prediction. If all branches of the current lookup are predicted not-taken, then the same cache line is looked up in the next cycle to obtain the remaining data. This sequential lookup continues until no more entries exist for the given cache line or until a branch to another cache line is predicted to occur or the PC or predicted PC changes for some other reason.

Figure 4:
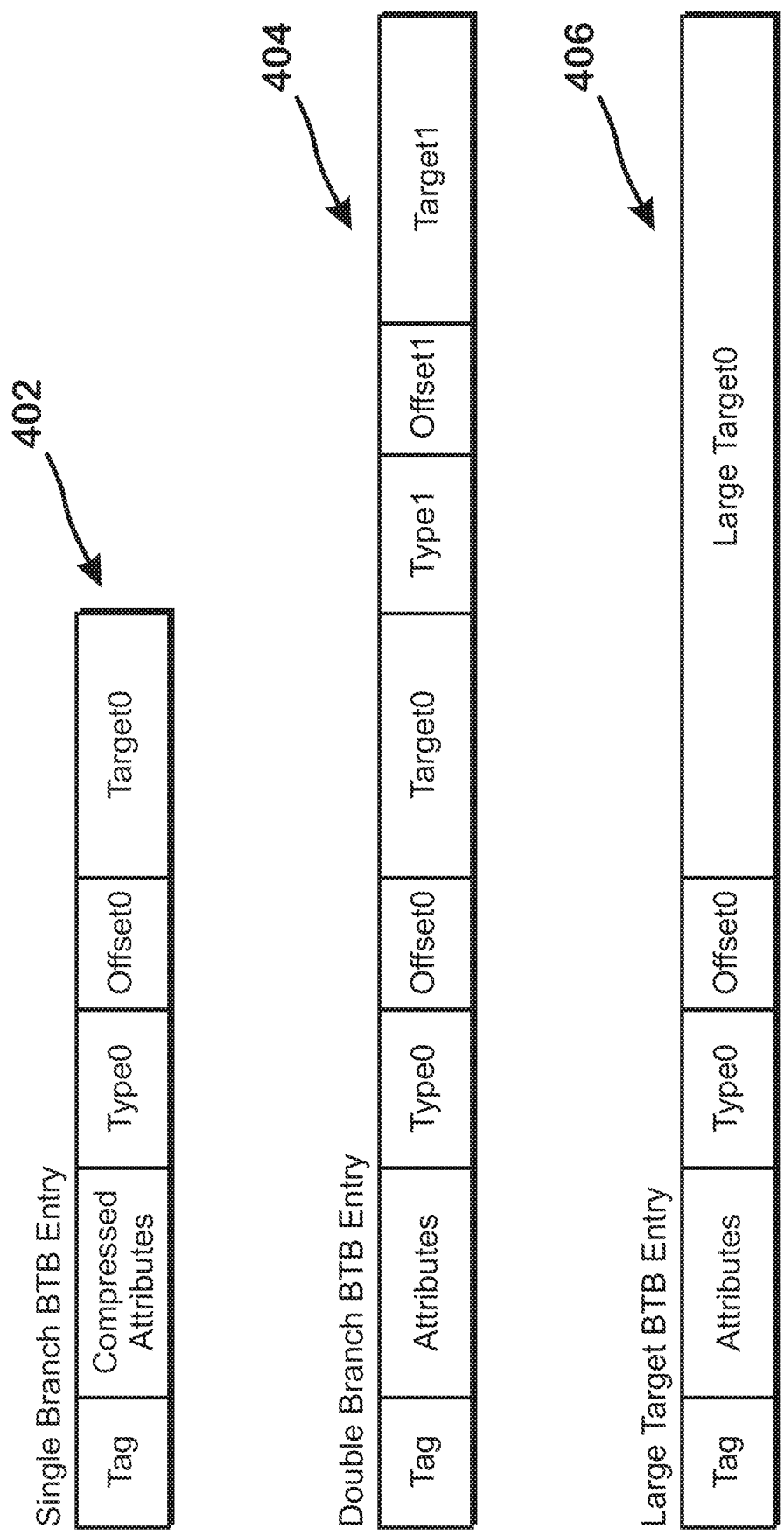
FIG. 4 is a diagram that illustrates entries for both an uncompressed branch target buffer and a compressed branch target buffer, according to an example.

FIG. 4 is a diagram that illustrates entries for both the uncompressed BTB 310 and the compressed BTB 312, according to an example. A single branch (compressed) BTB entry 402, a double branch (uncompressed) BTB entry 404, and a single branch large target (uncompressed) BTB entry 406 are shown.

The single branch (compressed) BTB entry 402 includes a tag, compressed attributes, a type, an offset, and a target. The tag is the address of the cache line in which a branch instruction is found. The compressed attributes include compressed attribute values. As described above, some attributes may be compressed by omitting attribute data, so that the corresponding attribute for any entry in the compressed BTB 312 is assumed to have a particular value for that attribute. Other attributes may be compressed by reducing the number of bits corresponding to an attribute and only allowing branch prediction data corresponding to predicted branches having certain attribute values to be stored in the compressed BTB 312. Yet other attributes may be compressed by combining two attribute fields into a shared attribute field with values that correspond to particular combinations of values for the two different attributes.

The type field stores the type of the branch. Some examples of the type field include an indication that the branch is an unconditional jump, a conditional jump, an indirect call, a call, a return, or an indirect jump.

The offset field indicates the location in the cache line in which the branch instruction is found. The target field indicates the predicted target address of the branch instruction. As indicated above, the target field may be shorter than the full address of the target because branches typically have nearby targets. In fact, all entries in the compressed BTB 312 store such shortened targets. If an entry requires a target field that is not short (i.e., is a "large target"), then the entry is stored as a large target BTB entry 406 in uncompressed BTB 310.

The double branch BTB entry 404 includes data for two branches. Note that these two branches are both found in the same cache line, as there is only one tag for the double branch BTB entry 404. Additionally, the data in the double branch BTB entry 404 is stored in an uncompressed manner. More specifically, data for each attribute is explicitly stored, the type field is uncompressed, and other data that would be compressed out in the compressed BTB 312 is not compressed out. The double branch BTB entry 404 also includes one type field and one offset field for each of the two stored branch targets.

Thus, bits that would be omitted from entries in the compressed BTB 312 are included, values that would be compressed are stored in an uncompressed manner, and shared fields are split into individual fields. The type field, which may be compressed or shared in the compressed BTB 312, is uncompressed in the double branch BTB entry 404.

The large target BTB entry 406 stores a tag, attributes, a type field, and a single large target field for a single branch target, all in an uncompressed manner. The large target BTB entry 406 is similar to the double branch BTB entry 404 except that the large target BTB entry 406 includes data for only one branch and that the target value is large and includes more bits than the target field in the double branch BTB entry 404.

Some example attribute compressions are now described. Note that some of these compressions may also involve the "type" field in addition to the "attributes" field. One example of an attribute that can be compressed is the last-in-cache line field ("LIC field"). This field indicates whether a particular entry stores data for a branch that is the last branch in a particular cache line. The purpose of this field is to allow the branch prediction unit 206 to know, after obtaining a particular BTB entry, whether to continue scanning a particular cache line for branches on the next cycle or whether to proceed to the next cache line on the next cycle because no more branches remain in that particular cache line.

In the common case, the value of the LIC field indicates that a particular branch is the last branch in the cache line, since having a large number of branches in a particular cache line is uncommon. Thus, entries in the compressed BTB are assumed to be this common case of being the last branch instruction in a cache line. If a BTB entry does not include a last-in-cache-line branch, then that BTB entry must be stored as an uncompressed BTB entry, in the uncompressed BTB 310. If, however, an entry includes a branch that is the last-in-cache-line branch, and the entry can otherwise be stored in the compressed BTB 312, then such an entry is created for the compressed BTB 312, and no value is included for the LIC field. All entries in the compressed BTB 312 are assumed to contain a last-in-cache-line branch. (Note that the term "last-in-cache-line" means last predicted branch in a cache line).

Another example compression technique is to compress out a valid field and indicate invalid entries using a specific value in the type field. The type field, which indicates the type of a branch, can have one of a plurality of values. Certain branch types are considered rare. In the compressed BTB 312, instead of indicating one of the rare types, a type field having the value for one of the rare types indicates instead that the entry is invalid. Branches having the rare type cannot be stored in the compressed BTB 312 and must instead be stored in the uncompressed BTB 310.

The valid field may thus be completely omitted in compressed BTB entries. More specifically, in uncompressed BTB entries, the valid field may indicate whether only one set of predicted branch data is valid, whether both sets are valid, whether the entry is for a large target branch, or whether the entire entry is invalid. Because compressed BTB entries cannot store data for two branches and cannot store data for a large target branch, "valid field" encodings for these entry types are unnecessary. The only differentiation that needs to be made for compressed BTB entries is between valid and invalid. As indicated above, an invalid entry is indicated by a specific type field encoding. Thus any type field encoding that does not indicate an invalid field indicates that the entry is valid. For this reason, no separate valid field is required for the compressed BTB entries. Note that the valid field encoding is an example of the shared-field compression discussed above—the type field and valid field are compressed into a single shared type/valid field.

Another example of a field that can be compressed is a shared-between-threads field. In the uncompressed BTB 310, the shared-between-threads field is used to indicate that a particular entry is shared between two threads executing in the instruction execution pipeline 200. During execution, the execution pipeline 200 may process instructions from different threads and keep track of which threads the instructions (including branches) belong to. In a shared execution mode, two threads can execute together and run the same set of instructions. In the branch prediction unit 206, two threads running in a shared execution mode share BTB entries so that entries are not duplicated for the two threads. Because shared execution is uncommon, the shared-between-threads field may be compressed out in the compressed BTB 312. Thus, no shared bit is stored for entries in the compressed BTB 312. Instead, all entries in the compressed BTB 312 are assumed to be unshared. Entries for shared branches are stored in the uncompressed BTB 310.

The above compressions are only examples. Different implementations of the techniques described herein may compress other attributes and/or compress the above-described attributes in different ways.

For writing data to the compressed BTB 312, logic is included in the branch prediction unit 206 that compresses or removes attribute bits. Similarly, for reading data from the compressed BTB 312, logic is included in the branch prediction unit 206 that restores or decompresses attribute bits.

Although the tag is described as being the cache line address, this is just one example of the format of a tag. The tag may include only a portion of the cache line address or may be some other value related to or unrelated to cache line address of the predicted branches for which data is stored in the BTB.

Figure 5:
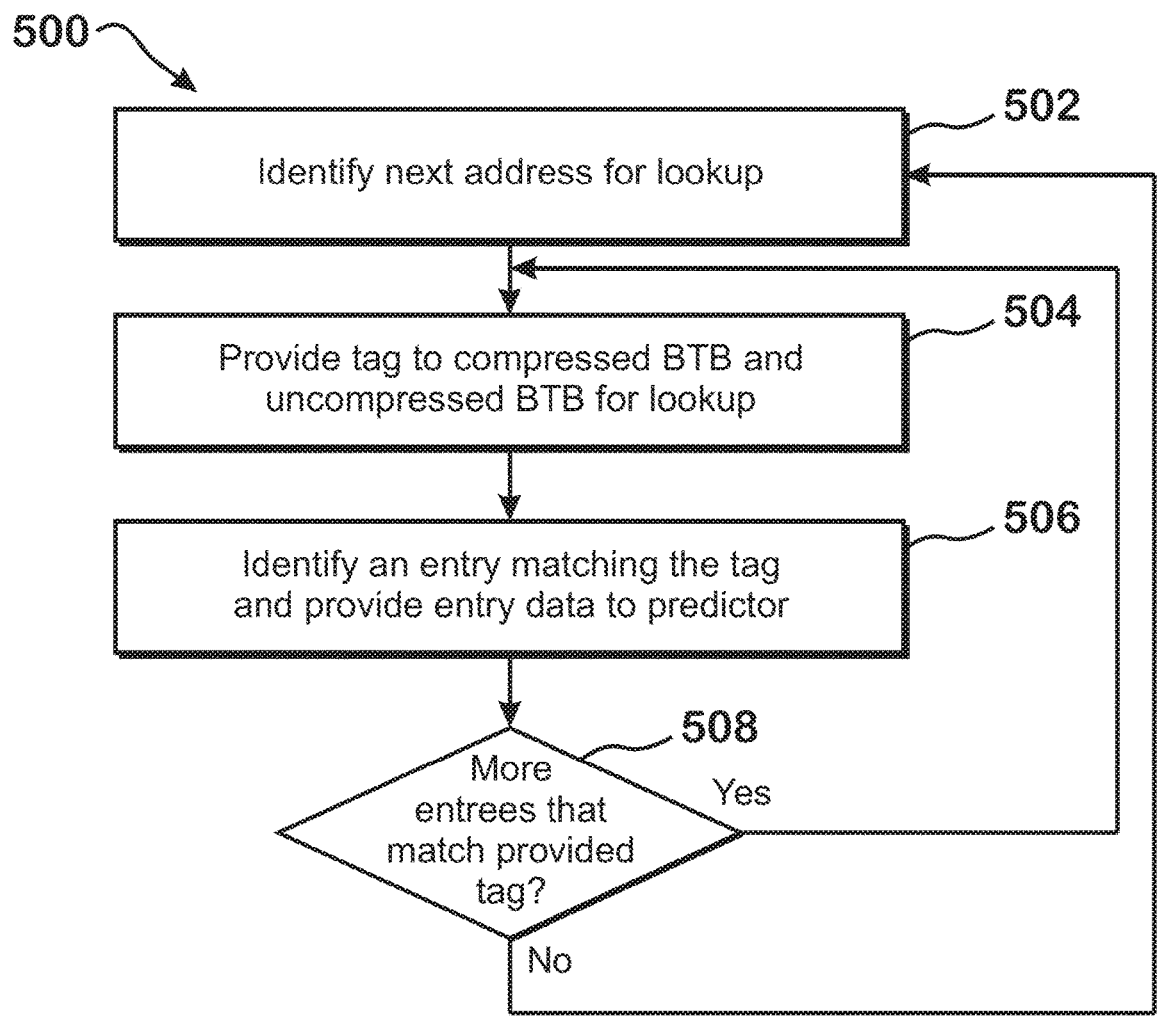
FIG. 5 is a flow diagram of a method for obtaining branch target prediction data using compressed and uncompressed branch target buffers, according to an example.

FIG. 5 is a flow diagram of a method 500 for obtaining branch target prediction data using compressed and uncompressed branch target buffers, according to an example. Although described with respect to the system shown and described with respect to FIGS. 1-4, it should be understood that any system configured to perform the method, in any technically feasible order, falls within the scope of the present disclosure.

As shown, the method 500 begins at step 502, where the predictor 306 identifies a next address for lookup. This next address includes a cache line address of the next cache line to examine for branch prediction. The predictor 306 identifies this cache line address based on the previous branch prediction operations. For example, if the predictor 306 previously predicted a branch to have been taken and obtained the predicted target address for that branch, the predictor 306 provides a cache line corresponding to the cache line of the branch target. If the predictor 306 previously predicted that no branch was to be taken, then the predictor 306 provides the address of the next sequential cache line to be examined for prediction. If the current cache line is still being examined for prediction due to there being multiple hits for a single cache line in the compressed BTB 312 and uncompressed BTB 310, then the predictor 306 provides the address of the current cache line.

At step 504, the uncompressed BTB 310 and the compressed BTB 312 receive the cache line address from the predictor 306. The cache line address acts as a tag to look up entries in the compressed BTB 312 and the uncompressed BTB 310. At step 506, the uncompressed BTB 310 and the compressed BTB 312 identify an entry matching the tag and provide the entry to the predictor 306 for further processing. As described above, the uncompressed BTB 310 and the compressed BTB 312 correspond to different ways of an n-way associative cache made up by the uncompressed BTB 310 and the compressed BTB 312 together. Thus, the tag can be provided to both the uncompressed BTB 310 and the compressed BTB 312 in parallel in the same cycle. If no hits occur, then neither the uncompressed BTB 310 nor the compressed BTB 312 indicates a predicted match for the cache line being looked up. If a single hit occurs in either the compressed BTB 312 or the uncompressed BTB 310, then the BTB in which the hit occurs provides the predicted branch data to the predictor 306 for prediction. If multiple hits occur, then the compressed BTB 312 or the uncompressed BTB 310 provides data from a single entry to the predictor 306 for prediction. As discussed below with respect to step 508, in this situation, the compressed BTB 312 and the uncompressed BTB 310 perform another lookup with the same cache line address in the next cycle because branch prediction data for that cache line still exists. In one example, the compressed BTB 312 and the uncompressed BTB 310 select an entry that corresponds to the "earliest" (i.e., lowest PC) entry in the current cache line for which prediction data has not yet been provided to the predictor 306.

At step 508, the compressed BTB 312 and the uncompressed BTB 310 determine whether there are additional entries that correspond to the same cache line address. If there are additional such entries, then the method 500 returns to step 504, where the same tag is again provided to look up additional entries for the same cache line address. If there are no such additional entries, then the method 500 returns to step 502, where the predictor 306 obtains another cache line address for prediction.

Providing the cache line address as a tag lookup to the BTB is only an example and that other tag types may be used. For example, the tag may alternatively include only a portion of the cache line address, some value derived from the cache line address or portion thereof, or may be some other value related to or unrelated to the cache line address of the predicted branches for which data is stored in the BTB.

Figure 6:
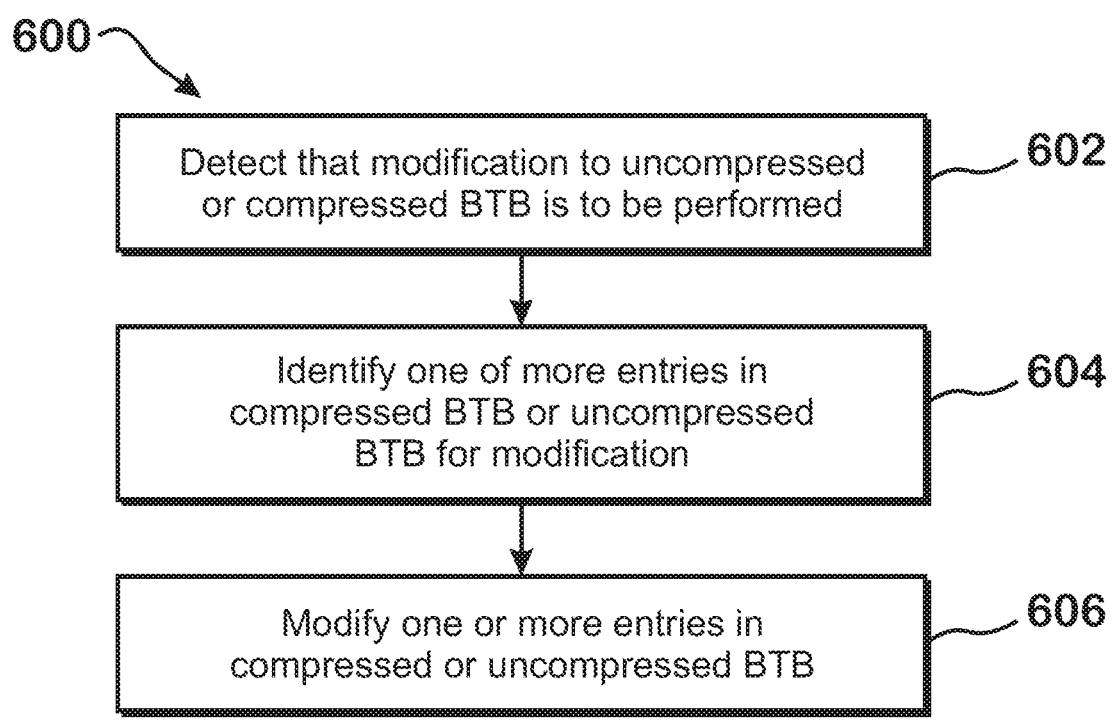
FIG. 6 is a flow diagram of a method for updating the uncompressed branch target buffer and compressed branch target buffer, according to an example.

FIG. 6 is a flow diagram of a method 600 for updating the uncompressed BTB 310 and the compressed BTB 312, according to an example. Although described with respect to the system shown and described in FIGS. 1-4, it should be understood that any system configured to perform the method, in any technically feasible order, falls within the scope of the present disclosure.

As shown, the method 600 begins at step 602, where the branch prediction unit 206 determines that modification to the uncompressed BTB 312, or both is to be performed. The branch prediction unit 206 makes such a determination upon detecting that a branch misprediction has occurred. A branch misprediction may be an incorrect direction (e.g., the taken/not-taken decision was predicted inaccurately), an incorrect target (the target address stored in the BTB was wrong), an incorrect type of branch predicted (the branch type predicted was wrong), or not-a-branch (an instruction predicted as a branch turned out to instead not be a branch). The instruction execution pipeline 200 detects a branch misprediction by executing branch instructions and comparing the results of the executed branch instructions to branch predictions that have occurred previously. A difference between prediction and execution means that a branch misprediction has occurred. The instruction execution pipeline 200 provides information about the misprediction to the branch prediction unit 206 to correct its internal state for better accuracy for future branch predictions.

At step 604, in response to receiving an indication that the compressed BTB 312, the uncompressed BTB 310, or both is to be modified, the branch prediction unit 206 identifies one or more entries that are to be modified. Modification can include deletion of data for a particular branch instruction, modification of data for a branch instruction, or addition of data for a branch instruction. For addition, the branch prediction unit 206 identifies an entry in the compressed BTB 312 or the uncompressed BTB 310 based on the cache line address, based on whether other branch prediction data already exists for the same cache line, and based on whether the branch prediction data can be compressed. For deletion and modification, the branch prediction unit 206 identifies the entry having the tag that matches the cache line address of the branch at issue and the offset within that cache line of the branch at issue.

For deletion of branch data, the branch prediction unit 206 identifies an already-present BTB entry based on the address of the branch instruction as an entry to be invalidated or modified.

For modification of branch data, the branch prediction unit 206 identifies an already present entry based on the address of the branch instruction and may also identify other entries depending on whether the modified entry must be moved between the compressed BTB 312 and the uncompressed BTB 310 for reasons such as a modification that causes the entry to no longer be compressible, or for other reasons.

At step 606, the branch prediction unit 206 modifies the one or more identified entries to accommodate the required modification. If the modification requires deleting data for a branch from the compressed BTB 312 or the uncompressed BTB 310, then the branch prediction unit 206 deletes the entire BTB entry.

If the modification requires changing data for a particular branch stored within a particular entry, then the branch prediction unit 206 determines whether the altered entry should be moved from the compressed BTB 312 to the uncompressed BTB 310 due to a change in whether the altered entry can be compressed. For example, if an entry that is compressed, when modified, can no longer be compressed, then the branch prediction unit 206 moves the entry from the compressed BTB 312 to the uncompressed BTB 310. If no such change is to be made then the branch prediction unit 206 simply alters the data in the entry as prescribed. If such a change is made, then the branch prediction unit 206 moves the corresponding data, invalidating the original entry and writing a new entry at the destination.

If the modification requires adding data for a branch not previously stored in the compressed BTB 312 or the uncompressed BTB 310, then the branch prediction unit 206 determines whether the data for the branch can be stored with data for another branch in a double branch BTB entry 404. If the data for the branch to be added can be stored with data for another branch, and that other branch is stored in the compressed BTB 312, then the branch prediction unit 206 invalidates the single branch BTB entry 402 for the other branch and creates a new double branch BTB entry 404 storing data for both branches. Data for two branches can be stored together if the branches share a cache line address and neither branch requires a large target BTB entry 406.

If the data for the branch to be added cannot be stored with data for another branch but can be compressed, then the branch prediction unit 206 creates a new single branch BTB entry 402 in the compressed BTB 312 and stores the data for the new branch in that entry. If the data for the branch to be added cannot be stored with data for another branch and cannot be compressed, then the branch prediction unit 206 creates a new entry in the uncompressed BTB 310 and stores data for the new branch in that new entry. Data can be compressed if the attributes for the data match the "common case" for branches as described above with respect to FIGS. 3 and 4 and if the data does not require a large target BTB entry 406.

The techniques described herein improve branch prediction operation in a computer processor. More specifically, by providing compressed and uncompressed BTBs that can be searched in parallel, prediction data for up to two branches per cycle can be obtained without a large waste of space associated with unused branch data space.

It should be understood that many variations are possible based on the disclosure herein. Although features and elements are described above in particular combinations, each feature or element may be used alone without the other features and elements or in various combinations with or without other features and elements.

The methods provided may be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors may be manufactured by configuring a manufacturing process using the results of processed hardware description language (HDL) instructions and other intermediary data including netlists (such instructions capable of being stored on a computer readable media). The results of such processing may be maskworks that are then used in a semiconductor manufacturing process to manufacture a processor which implements aspects of the embodiments.

The methods or flow charts provided herein may be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for manipulating branch target buffer data, the method comprising:

identifying first branch target data for a single branch to be stored in the branch target buffer;

determining that storing the first branch target data within an uncompressed branch target buffer would result in a non-full branch target buffer entry, because the first branch target data does not share a cache line address with another branch target data that could be stored in the non-full branch target buffer entry, the uncompressed branch target buffer being configured to store entries that include data for more than one branch located in the same cache line;

responsive to the determining, storing a first compressed branch target buffer entry in a compressed branch target buffer that is configured to store entries that each include data for only a single branch;

providing a lookup tag to the compressed branch target buffer and the uncompressed branch target buffer;

identifying a branch target buffer entry from one or both of the compressed branch target buffer and the uncompressed branch target buffer based on the lookup tag; and outputting data corresponding to the branch target buffer entry to branch prediction logic for predicting a branch.

2. The method of claim 1, wherein:

the lookup tag comprises a value related to a cache line address for a cache line examined for branch prediction; and the uncompressed branch target buffer is configured to store entries for branches that share the same cache line address.

3. The method of claim 1, wherein:

the compressed branch target buffer is configured to store entries for which one or more attributes are compressed; and the uncompressed branch target buffer is configured to store entries for which no attributes are compressed.

4. The method of claim 1, wherein:

entries of the uncompressed branch target buffer include first attribute values for a first attribute field; and entries of the compressed branch target buffer do not include attribute values for the first attribute field, wherein all entries of the compressed branch target buffer have the same value for the first attribute field.

5. The method of claim 1, wherein:

a first attribute field for entries of the uncompressed branch target buffer comprises a last-in-cache line field that indicates whether an entry includes data for a branch that is a last predicted branch in a cache line; and the entries of the compressed branch target buffer are all configured to store data for branches that are a last predicted branch in a cache line but do not include the last-in-cache line field.

6. The method of claim 1, wherein identifying the branch target buffer entry comprises:

detecting that more than one branch target buffer entry in either the compressed branch target buffer or the uncompressed branch target buffer shares a tag with the lookup tag, and the method further comprises selecting one of the more than one branch target buffer entries for output.

7. The method of claim 6, further comprising:

on a processing cycle subsequent to a first cycle in which the one of the one or more branch target buffer entries is selected, selecting a second branch target buffer entry of the more than one branch target buffer entries for output.

8. A branch prediction unit comprising:
a predictor;
a compressed branch target buffer, configured to store entries that each include data for only a single branch; and
an uncompressed branch target buffer, configured to store entries that include data for more than one branch located in the same cache line,
wherein the predictor is configured to:
identify first branch target data for a single branch to be stored in the branch target buffer,
determine that storing the first branch target data within the uncompressed branch target buffer would result in a non-full branch target buffer entry, because the first branch target data does not share a cache line address with another branch target data that could be stored in the non-full branch target buffer entry, and
responsive to the determining, cause a first compressed branch target buffer entry to be stored in the compressed branch target buffer, and
wherein both the compressed branch target buffer and the uncompressed branch target buffer are configured to:
identify one or more branch target buffer entries based on a provided lookup tag, and
output data corresponding to the identified one or more branch target buffer entries to prediction logic for predicting a branch.

9. The branch prediction unit of claim 8, wherein:
the lookup tag comprises a value related to a cache line address for a cache line examined for branch prediction; and
the uncompressed branch target buffer is configured to store entries for branches that share the same cache line address.

10. The branch prediction unit of claim 8, wherein:
the compressed branch target buffer is configured to store entries for which one or more attributes are compressed; and
the uncompressed branch target buffer is configured to store entries for which no attributes are compressed.

11. The branch prediction unit of claim 8, wherein:
entries of the uncompressed branch target buffer include first attribute values for a first attribute field; and
entries of the compressed branch target buffer do not include attribute values for the first attribute field,
wherein all entries of the compressed branch target buffer have the same value for the first attribute field.

12. The branch prediction unit of claim 8, wherein:
a first attribute field for entries of the uncompressed branch target buffer comprises a last-in-cache line field that indicates whether an entry includes data for a branch that is a last predicted branch in a cache line; and
the entries of the compressed branch target buffer are all configured to store data for branches that are a last predicted branch in a cache line but do not include the last-in-cache line field.

13. The branch prediction unit of claim 8, wherein:
the compressed branch target buffer and the uncompressed branch target buffer are configured to identify one or more branch target buffer entries by detecting that more than one branch target buffer entry in either the compressed branch target buffer or the uncompressed branch target buffer shares a tag with the lookup tag; and
the compressed branch target buffer and the uncompressed branch target buffer are configured to select one of the more than one branch target buffer entries for output.

14. The branch prediction unit of claim 13, wherein the compressed branch target buffer and the uncompressed branch target buffer are further configured to:
on a processing cycle subsequent to a first cycle in which the one of the one or more branch target buffer entries is selected, select a second branch target buffer entry of the more than one branch target buffer entries for output.

15. A processor, comprising:
a branch prediction unit configured to output branch prediction results;
an instruction fetch unit configured to output instructions for execution based on the branch prediction results; and
an instruction execution pipeline configured to execute the instructions output from the instruction fetch unit,
wherein the branch prediction unit comprises:
a predictor;
a compressed branch target buffer, configured to store entries that each include data for only a single branch; and
a uncompressed branch target buffer, configured to store entries that include data for more than one branch located in the same cache line,
wherein the predictor is configured to:
identify first branch target data for a single branch to be stored in the branch target buffer,
determine that storing the first branch target data within the uncompressed branch target buffer would result in a non-full branch target buffer entry, because the first branch target data does not share a cache line address with another branch target data that could be stored in the non-full branch target buffer entry, and
responsive to the determining, cause a first compressed branch target buffer entry to be stored in the compressed branch target buffer, and
wherein both the compressed branch target buffer and the uncompressed branch target buffer are configured to:
identify one or more branch target buffer entries based on a provided lookup tag, and
output data corresponding to the identified one or more branch target buffer entries to prediction logic for predicting a branch.

16. The processor of claim 15, wherein:
the lookup tag comprises a value related to a cache line address for a cache line examined for branch prediction; and
the uncompressed branch target buffer is configured to store entries for branches that share the same cache line address.

17. The processor of claim 15, wherein:
the compressed branch target buffer is configured to store entries for which one or more attributes are compressed; and
the uncompressed branch target buffer is configured to store entries for which no attributes are compressed.

18. The processor of claim 15, wherein:
entries of the uncompressed branch target buffer include first attribute values for a first attribute field; and
entries of the compressed branch target buffer do not include attribute values for the first attribute field,
wherein all entries of the compressed branch target buffer have the same value for the first attribute field.

19. The processor of claim 15, wherein:
a first attribute field for entries of the uncompressed branch target buffer comprises a last-in-cache line field that indicates whether an entry includes data for a branch that is a last predicted branch in a cache line; and
the entries of the compressed branch target buffer are all configured to store data for branches that are a last predicted branch in a cache line but do not include the last-in-cache line field.

20. The processor of claim 15, wherein:
the compressed branch target buffer and the uncompressed branch target buffer are configured to identify one or more branch target buffer entries by detecting that more than one branch target buffer entry in either the compressed branch target buffer or the uncompressed branch target buffer shares a tag with the lookup tag; and
the compressed branch target buffer and the uncompressed branch target buffer are configured to select one of the more than one branch target buffer entries for output.

\* \* \* \* \*